Aug. 7, 1956  K. GREBE  2,757,786
ENDLESS CONVEYORS
Filed Aug. 12, 1950  5 Sheets-Sheet 4
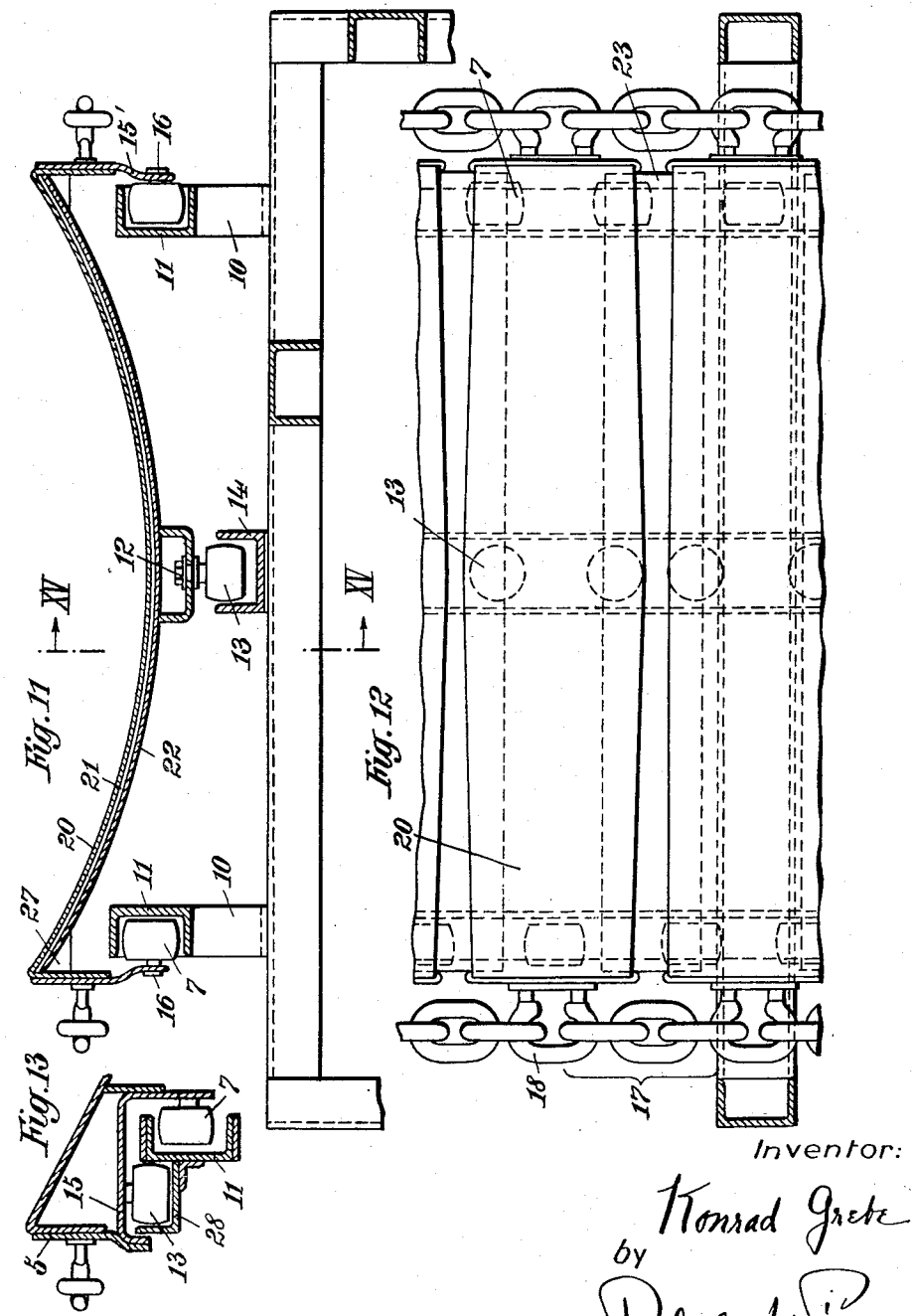
Inventor:
Konrad Grebe
by
Attorney Aug. 7, 1956
K. GREBE
2,757,786
ENDLESS CONVEYORS
Filed Aug. 12, 1950
5 Sheets-Sheet 5
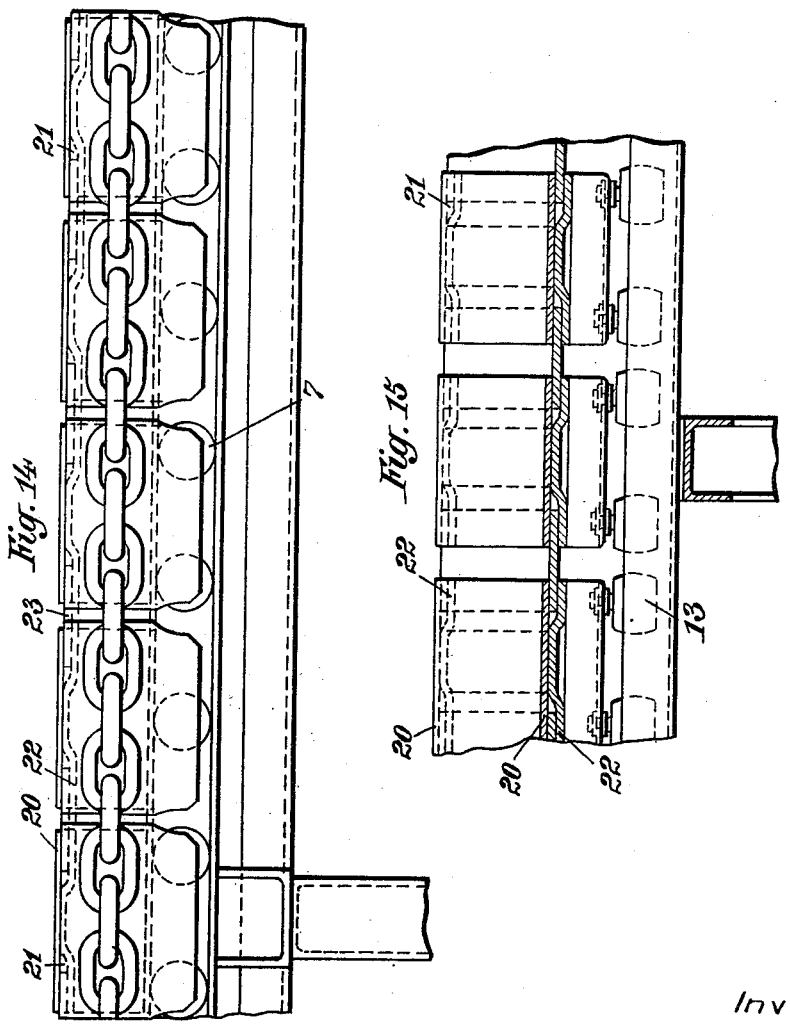
Inventor:
Konrad Grebe
by
Attorney

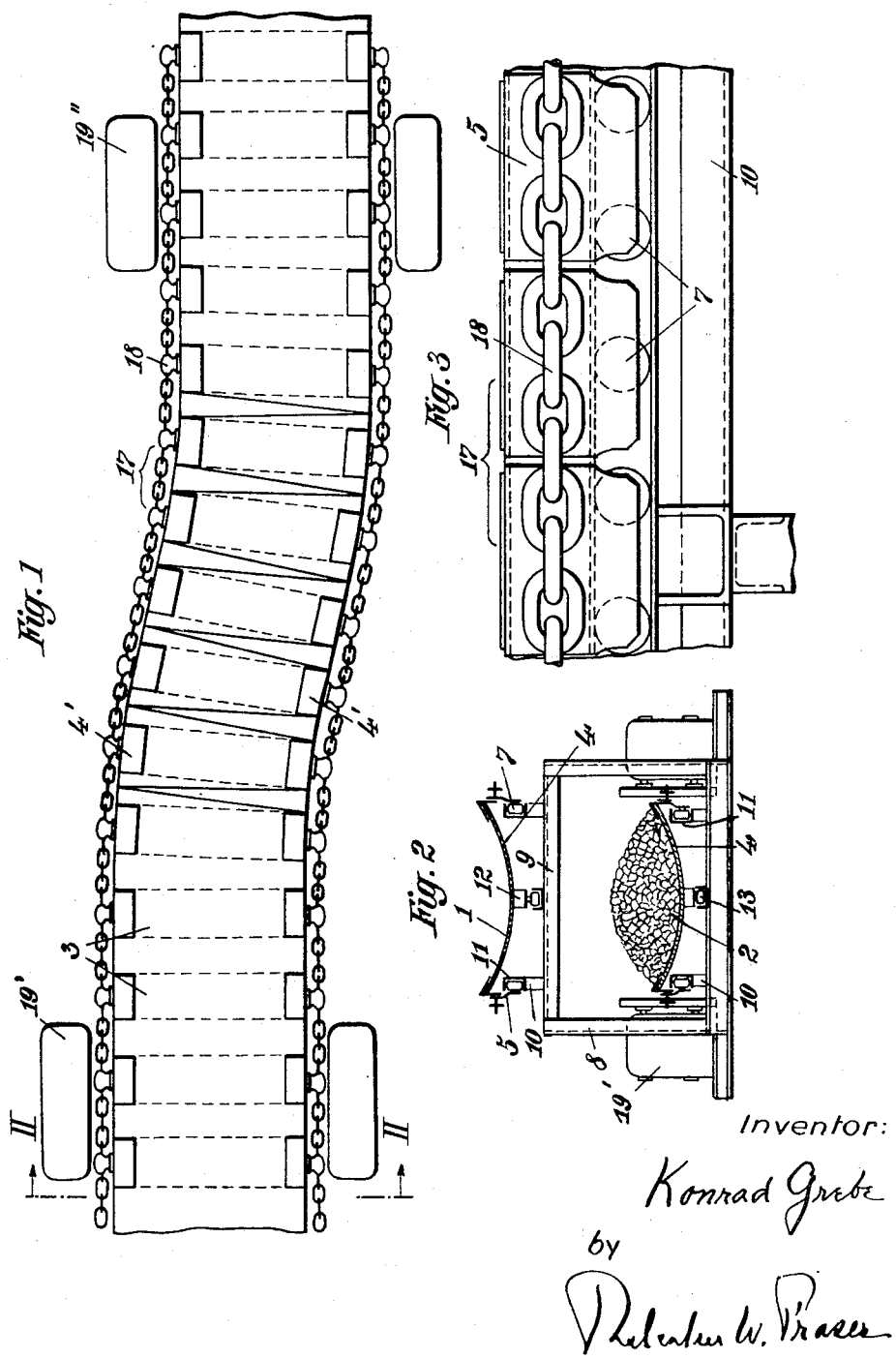

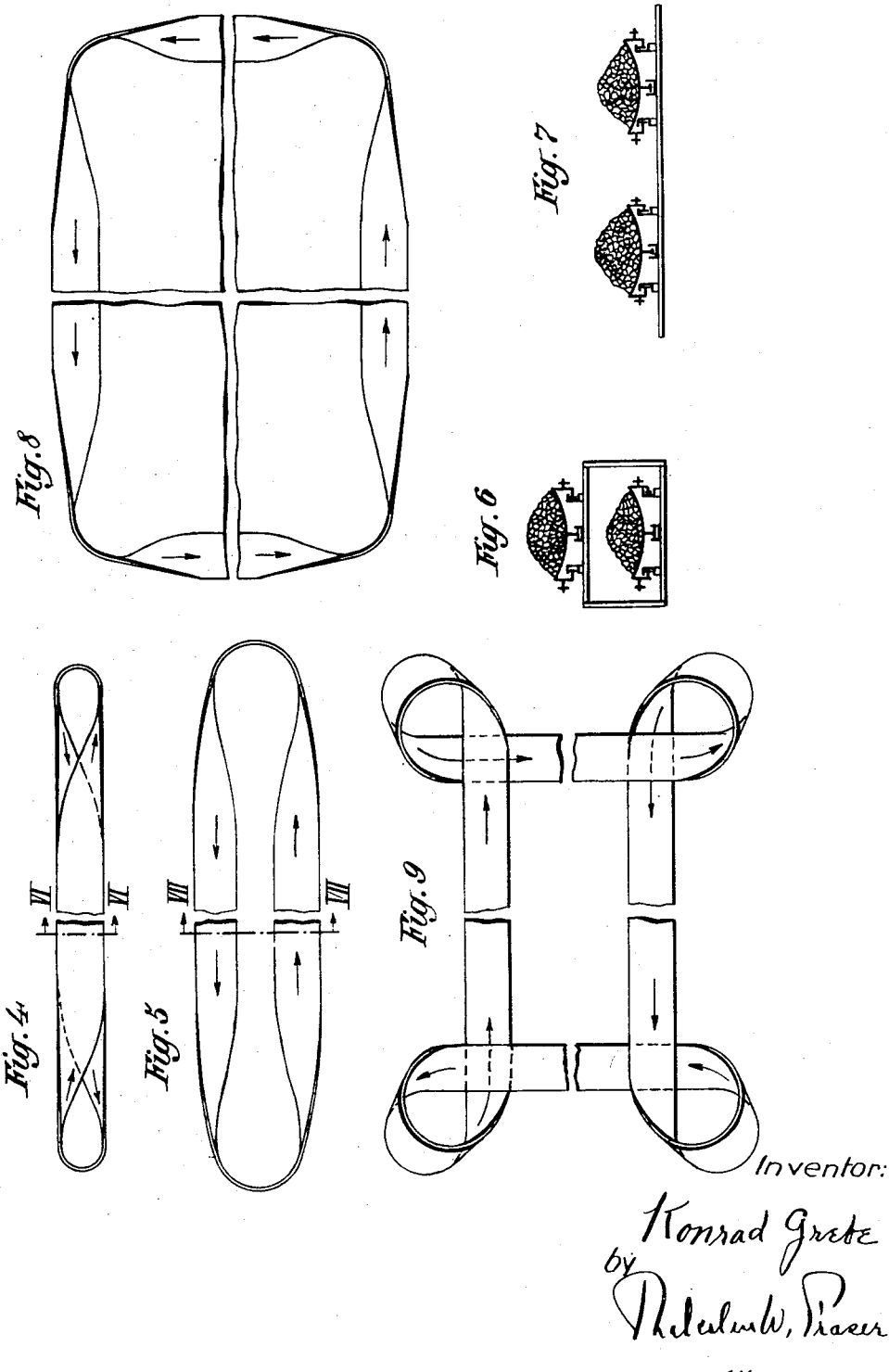

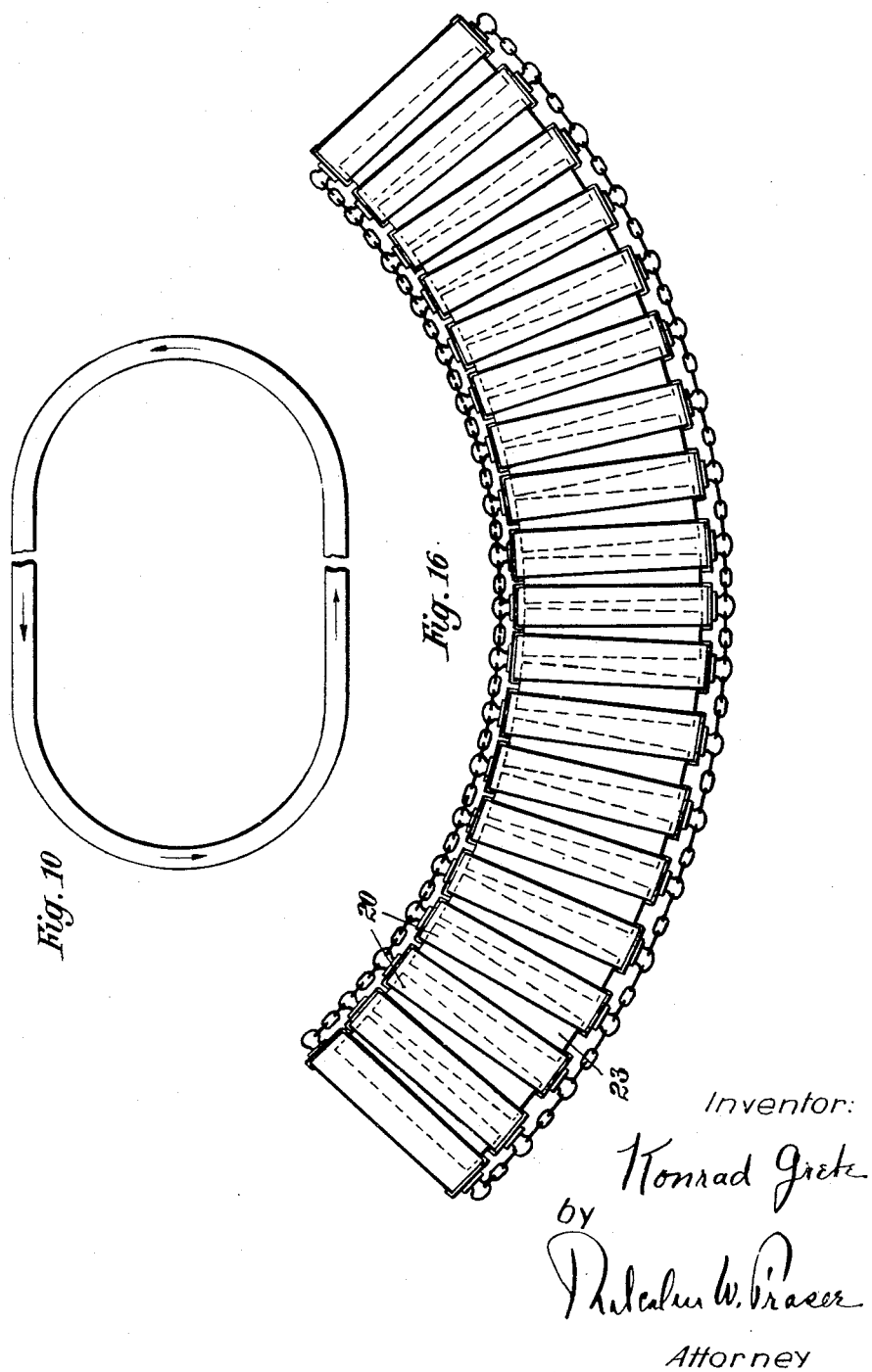

United States Patent Office 2,757,786
Patented Aug. 7, 1956

2,757,786

ENDLESS CONVEYORS

Konrad Grebe, Ibbenburen, Germany

Application August 12, 1950, Serial No. 179,045

5 Claims. (Cl. 198—181)

This invention relates to an endless conveyor which, owing to its special design and properties, is particularly suited as a gallery conveyor in mining because it satisfies the whole of the requirements made of such conveyors. Its use, however, is not limited to mining.

The most important of the aforesaid requirements is the possibility of installing the conveyor with any required curves both horizontally and vertically in order that it may conform to all curves occurring in the gallery and also to the direction of the gallery floor.

Further it is often desirable to be able to use such a conveyor for conveyance in both directions at the same time, for example, carrying away in one run the coal or the like which has been mined and in the other run to bring along filling rock.

The confined conditions in mining also frequently render it necessary to place the two ends in different positions relatively to each other, for example the returning end may be below, above or also laterally of the end which runs forwardly, or even at a certain lateral distance in another gallery.

Efficient running of the conveyor must be ensured even when curves of relatively small radius and also considerable local ascents which may be up to 40% have to be dealt with. It is further desirable to be able to use such a conveyor not only for the transport of coal and/or filling rock but also for the transport of material, machines or the like, up to comparatively large weights.

Of particular importance is the possibility of any desired lengthening and shortening of the conveyor. The requirements also include the general ones of low power consumption, absolute reliability, small need of repairs and the possibility of rapidly carrying out any required overhauls.

In accordance with this invention, a conveying means is provided adapted particularly for all conditions which occur in underground mining. The conveying means may be so installed that any required surfaces, either horizontal or vertical, may be used for conveying material in both directions. It is particularly useful in confined regions in mining and combines the advantages of the belt conveyor with those of the flat band conveyor, and a truck conveyance.

According to a special embodiment of the invention, there is employed a band made of sections which are connected with each other by the successive trucks, the band-supporting surface of which is thus converted into a part of the conveyor itself. In that case the trucks are indeed so close that the parts of the band which lie between them and which consist of individual flexible plates are not subjected to any flection strain worth mentioning as carrier elements. This makes it possible to insert these individual sections, made of elastic material, loosely in slots of the truck without their being involved in the locomotion of the band. In this way the flexible plates when passing through curves and reversals can move relative horizontally or vertically in the slot guides without undergoing deformations. Also the flexing of the band upwards or downwards and a tilt of the entire band strip is facilitated although strong rubber or like plates of correspondingly longer duration can be used.

A remarkable advantage connected with this embodiment is that now the entire band consists of a plurality of small and like components which can be easily interchanged and connected and which, above all, facilitate the lengthening or shortening to any desired extent of the conveyor.

Further advantages, features and details of the invention will be evident from the following description with reference to the drawings.

In the drawings:

Figure 1 is a plan view of a section of the conveyor conducted through a curve;

Figure 2 is a cross section along the line II—II of Figure 1, and

Figure 3 is a side view of part of the conveyor shown in Figure 1.

These figures show, in principle, the design of the band and the trucks.

Figures 4–10 show diagrammatically various possibilities for the mounting of the band, namely;

Figures 4 and 5 are plan views showing the arrangement of the reversal points;

Figures 6 and 7 are sections through the line VI—VI and VII—VII of Figures 4 and 5 respectively, which exhibit the relative positions to each other of the buckets, and Figures 8, 9 and 10 show different possibilities for the return of the band through another gallery of a mine.

Figures 11–16 show a second embodiment of the invention namely:

Figure 11 is a cross section through a truck;

Figure 12 is a partial plan view;

Figure 13 is a sectional view illustrating another design of the additional guide;

Figure 14 is a side view showing the connection of the band sections and the trucks with each other;

Figure 15 is a section taken on the line 15—15 of Figure 11, and

Figure 16 is a plan view showing the conveyor according to Figures 11–15 on a curve.

In the embodiment of the new conveyor shown in Figures 1-3 the continuous band, the top run of which is denoted by 1 and its bottom bucket by 2 is fixed on the spaced trucks 3. Each truck consists of a trough-shaped carrier plate 4 with side cheeks 5 fixed thereto. On these side cheeks are mounted the running rollers 7. Between the side cheeks 5 and the trough-shaped carrier plate 4 supporting angle plates 27 (visible in Figure 11) can be provided.

On the frame structure 8 are fixed the U-shaped guide irons 11, preferably at a certain height above its cross beam 9. The guides 11 are secured on longitudinal carriers 10 and according to the constructional example shown, rest on one of their flanges so that they are open outwards and receive the running rollers 7. Each of the trucks 3 has either a pair of rollers on each side or, as is to be seen from Figure 12, for the purpose of saving material and easier mobility, a pair of rollers on one side and a single roller on the other side, the arrangement being such that in the successive trucks a roller and a pair of rollers always follow alternately. All running rollers are rotatable independently of each other.

The mounting of the rollers on the trucks is effected, as shown in detail in the construction according to Figures 11–12, for example, by means of yokes 15', which can form a part of the side cheeks 5 of the trucks, to which they are screwed, riveted or the like and it may be desirable to adopt an arrangement which permits easy removal of the rollers alone or together with the yokes 15'. The rollers are rotatably mounted in bearings 16.

The running rollers cannot lift themselves out of the U irons 11 which open toward the side, and they travel in the U irons with a certain amount of play. They travel, under the influence of tractive forces exerted on them either from below or from above, against the flanges so that in this way any tilting of the side parts and therefore of the trucks upwards or downwards becomes impossible. If a side part tends for example to rise forwards this is only possible within the range of play with which the foremost of the rollers 7 travels in the U iron guide i. e. until it engages the upper flange of the U iron. In addition to the roller guides described there are additional guides in the form of guide rollers 13, in pairs, rotating around vertical shafts and arranged at 12 in the manner of the embodiment according to Figure 2 in the centre of the truck 3. Rollers 13 travel with a certain play in a U iron 14, which is open at the top and provided on the frame structure. These guide rollers 13, according to the strains which occur, travel right or left against the side flanges of the guiding U iron, and as they are arranged in pairs, they take up the lateral pressures and torques which are exerted on the band or on the truck. In this way the possibility of twist of the trucks, such as would otherwise occur when traversing curves is eliminated because here the trucks are only pulled on one side by the traction agent operating on the outside. This traction agent provides the non-rigid connection of the several trucks at the required spacing from each other, and consists of link chain portions 17 which are connected with each other by yokes 18. These yokes are in their turn removably connected to the side cheeks 5 of the trucks and form components of the traction means itself since at the points in question they replace the normal chain links.

This design of the traction agent renders possible in a very simple way the distribution of the drives over the length of the conveyor.

Instead of oval-link chains such as are commonly used for lifting chains, link-pin type chains such as are used for chain drives (i. e. of the same type as a bicycle chain though of suitably larger size) may be used but they require a special design as compared with normal driving chains because the latter afford no possibility of a lateral bend which is, however, an essential condition for producing the curve-traversing ability of the conveyor.

Lateral deflection of the chain is provided for by the pins which hold together the links of the chain being slightly barrel-shaped, the bushings for the pins in intermediate links being given a corresponding form.

The mounting of the band on the trucks, i. e. their moulded carrier plates 4, can be effected by screws but preferably as shown at 4' by clamping between the inwardly-bent ends of the plates 4 in such a way that they embrace the band edges and at the same time afford protection against injury. This mode of fixing further allows of fitting on the ends of the plates which are bent round and lie on the band, angle irons (not shown in the drawings) which for example on rising dispositions of the band act as carriers for the material conveyed and in case of falling dispositions have a brake action thereon.

Figures 4 and 5 show diagrammatically the possibilities of reversal of the band installation, the forward and the return portions of the band being arranged one above the other according to Figure 4 and next to each other according to Figure 5.

Needless to say however, other arrangements, particularly combinations of the two illustrated, are possible; for example the return band portion, in order to facilitate feeding of the material, may be first guided alongside the forward portion and then, especially in order to save space, guided above or below it.

Figures 6 and 7 show diagrammatically the position of the band portions in relation to each other as it occurs in the several cases. If the use of the lower portion for conveyance can be dispensed with, the possibility of course results of overhead reversal as in other belt installations.

Figures 8 to 10 show diagrammatically arrangements such as result when, as is often desirable, the band is made to run back over a different course. According to Figure 8 four rectangular bends result, in traversing which the goods conveyed are ejected.

Figure 9 shows an arrangement in which the material conveyed is not ejected but is transported onwards over the rectangular or almost rectangular bends. For this purpose the band is disposed in such a way that the part of it which has traversed the bend is below the arriving part of the band. The material conveyed, which is positively ejected in the loop through the high canting of the band, can by way of a short chute be again delivered onto the horizontal part of the band running below and be carried onwards by the latter. If, as is possible in band constructions according to the invention, such small angles are to be traversed in normal curves without throwing out the material (Figure 10) a somewhat larger radius of the curves than that of Figures 8 and 9 is necessary.

Figures 11 to 16 relate to the embodiment of the invention in which, instead of a continuous band, a band consisting of individual portions with the trucks interposed between them is used. In this embodiment the trough-shaped plates 20 of the trucks are themselves a part of the conveying surface, being the main carrier components thereof. The completion of the conveyor surface to form a continuous band by the band portions of elastic material interposed between the trucks imparts to the band as a whole the properties of a continuous elastic band.

The connection of these band portions with the trucks is effected preferably as shown in particular in Figures 14 and 15 by inserting their ends in channels 21 which are formed between a bottom plate 22 of the truck and a covering plate 20 thereof owing to the fact that these two plates are firmly connected with each other over the entire width of the band, for example by screws, rivets or welding, in such a way that the central portions of the plates are brought into contact. The flexible connecting plates 23 are inserted into these channels which thus extend on both sides to near the middle. These plates consist of rubber, spring steel or the like. They are freely movable to a certain extent in the channels so that on passing through a curve the inward sides of the plates move somewhat more deeply into the channels. The sides of the plates on the outside of the curve keep their normal position since here the normal distance between the trucks, which is regulated by the length of the stretched traction agent, is not altered. On the inner curve, however, the trucks are pushed nearer each other, as the traction agent hangs loosely (Figure 16).

While the connecting plates 23 on passing over a horizontal curve are only thrust into the channels 21, without bending, on passing through troughs, over saddles, and at overhead reversal points they are required to bend. In the lateral twisting of the band which occurs when before reversal the band is brought out of the horizontal into the vertical position, the connecting plates are then bent on one side upwards and on the other side downwards.

The risk that particles of the goods conveyed will penetrate into the channels can be minimized by holes (not shown) in the bottom plate 22 of the truck.

In order to increase the stability of the truck, and as carriers for the material conveyed, there may be stamped in the covering plates 20 beads or dimples (not shown) extending obliquely if required over the entire width of the band. As will be seen from Figure 12 the covering and under plates 20 and 22 are preferably somewhat widened in the centre in order to prevent the connecting plates 23 from slipping out, especially at the reversal point. This also reduces the distance bridged by the connecting plates 23 between two successive covering plates 20 and the connecting plates are therefore relieved of pressure at the most heavily loaded point.

The guiding of the trucks (Figure 11) is effected by rollers 7 which are mounted on the side cheeks 5 of the truck. The side cheeks 5 are secured to the carrying and under plates 20, 22 respectively. Between the side cheeks 5 and the carrying plates, supporting angle plates 27 may be provided.

Figure 13 shows another form of construction of this additional guide which can be used both in the last described and in the first embodiment of the new conveyor. In this form the guide rails 11 of channel section are arranged reversed with respect to the position shown in Figures 2 and 3 and 11, i. e. in such a manner that their web is directed outwards. On the outside of the web an angle iron 28 is fixed by which, together with the outside of the web, is formed the trough-shaped guide for guide rollers 13 which in this case are fixed to a side cheek 15 of the truck.

Although the conveyor according to the invention has been described above in detail with respect to certain constructional examples shown in the drawings the invention is of course by no means limited to these constructional examples and numerous modifications are possible without departing from the scope of the invention as defined in the appended claims.

I claim:

1. A mining conveyor comprising a plurality of closely spaced truck members, laterally and vertically arranged rollers on said truck members, stationary guide means individual to said laterally and vertically arranged rollers respectively for restricting lateral and vertical displacements as well as twisting of the truck members during translatory movements thereof, said guide means comprising U rails, and at least two rollers being arranged on one side of each of the track members, which rollers run selectively against the upper and lower flanges of the U rails, and one roller on the other side of each truck member, elastic members providing a connection between adjacent truck members to provide an uninterrupted conveying surface, and flexible traction means connecting said truck members.

2. A mining conveyor comprising a plurality of closely spaced truck members, laterally and vertically arranged rollers on said truck members, stationary guide means individual to said laterally and vertically arranged rollers respectively for restricting lateral and vertical displacements as well as twisting of the truck members during translatory movements thereof, said guide means comprising U rails, and at least two rollers being arranged on one side of each of the truck members, which rollers run selectively against the upper and lower flanges of the U rails, and one roller on the other side of each truck member, further guiding means comprising rollers rotatable about vertical axes mounted on the trucks below the middle thereof, and co-acting with additional guiding rails running in the middle of the supporting construction, elastic members providing a connection between adjacent truck members to provide an uninterrupted conveying surface, and flexible traction means connecting said truck members.

3. A mining conveyor comprising a plurality of closely spaced truck members, laterally and vertically arranged rollers on said truck members, stationary guide means individual to said laterally and vertically arranged rollers respectively for restricting lateral and vertical displacements as well as twisting of the truck members during translatory movements thereof, elastic members providing a connection between adjacent truck members to provide an uninterrupted conveying surface, and flexible traction means connecting said truck members, said traction means comprising link chains consisting of short sections mounted on the sides of each of the truck members by means of bucket yokes which themselves are parts of the continuous traction chain.

4. A conveyor comprising a plurality of closely spaced truck members, each truck member having upper and lower plates, a connection between the upper and lower plates of each truck member spacing same apart to provide transverse channels at opposite ends thereof, a plurality of spring plates, each plate having opposite end portions slidable in the channels of the adjacent fore and aft truck members and bridging the space therebetween, each spring plate being supported by a lower truck plate, the maximum width of the space between adjacent truck members being less than the depth of the channels, and a link chain on each side of the truck members and connected thereto to provide a continuous traction connection therebetween, said chains restricting the spacing between adjacent truck members.

5. A conveyor as claimed in claim 4, in which the connection between the upper and lower truck plates comprises a central embosture on the lower plate to abut flatly against the under side of the upper plate thereby providing substantially parallel end portions on the upper and lower plates for defining socket-like channels, the inner ends of which are closed to create a positive stop for the movement of the respective spring plate.

References Cited in the file of this patent

UNITED STATES PATENTS

| | | |
|---|---|---|
| 416,021 | Voll | Nov. 26, 1889 |
| 706,294 | Beck | Aug. 5, 1902 |
| 781,138 | Etcheverry | Jan. 31, 1905 |
| 809,827 | Lucas | Jan. 9, 1906 |
| 1,155,340 | Davis | Oct. 5, 1915 |
| 1,366,780 | Fraley | Jan. 25, 1921 |
| 1,823,370 | Meem | Sept. 15, 1931 |
| 2,162,419 | Bryan | June 13, 1939 |